Nov. 17, 1970     TADIUS T. SADOSKI ET AL     3,541,376
FLUORESCENT LAMP WITH FILTER COATING OF A MIXTURE
OF $TiO_2$ AND $Sb_2O_3$
Filed Nov. 13, 1968

WILLY P. SCHREURS
TADIUS T. SADOSKI
INVENTORS
BY
ATTORNEY

3,541,376
FLUORESCENT LAMP WITH FILTER COATING OF A MIXTURE OF TiO₂ AND Sb₂O₃

Tadius T. Sadoski, Salem, and Willy P. Schreurs, Danvers, Mass., assignors to Sylvania Electric Products Inc., a corporation of Delaware
Filed Nov. 13, 1968, Ser. No. 775,264
Int. Cl. H01j 1/62, 63/04
U.S. Cl. 313—109                              3 Claims

ABSTRACT OF THE DISCLOSURE

A fluorescent lamp with a coating of a mixture of $TiO_2$ and $Sb_2O_3$ disposed upon the glass. The $TiO_2$ layer filters unwanted ultraviolet radiation in the 3000 to 4000 A. region and reduces the emission of this light from the lamp. The $Sb_2O_3$ additions reduce the starting voltage of the lamp which is increased due to the $TiO_2$ coating.

BACKGROUND OF THE INVENTION

Field of the invention

This invention relates to fluorescent lamps and particularly to those which will be used for applications where ultraviolet emission in the 3000 to 4000 A. region is undesirable. Radiation in the 3000 to 4000 A. region tends to degrade plastics and can fade fabric colors due to photochemical reactions.

Summary of the prior art

In the past, it has been known to dispose $TiO_2$ as a coating upon the inner surface of glass envelopes. For example, the United States patent to Ray, No. 3,141,990 discloses a coating of $TiO_2$ to serve as a barrier between a soda-lime glass envelope and the mercury in the envelope. The coating prevents sodium in the glass from reacting with the mercury to produce an amalgam which would form a dark layer and reduce the transmission, thereby reducing the luminosity of the lamp.

Moreover, $Sb_2O_3$ has been used in conjunction with lamps. For example, the United States patent to Gungle, No. 3,094,641 discloses the addition of $Sb_2O_3$ to a soda-lime glass envelope to prevent the reduction of luminosity in the lamp due to amalgam formation. Apparently, the $Sb_2O_3$ ties up the sodium atoms and reduces their migration to the surface. Since less sodium atoms are exposed to the mercury, amalgam formation is reduced.

In the United States patent to Menelly, No. 3,379,917, the use of a reflective coating of $TiO_2$ with less than 1% of $Sb_2O_3$ is disclosed. The $TiO_2$ layer is quite thick and serves as a reflector for light emitted from the lamp. The $Sb_2O_3$ improves the light output and maintenance of the lamp.

SUMMARY OF THE INVENTION

According to the present invention, we have discovered that when a transparent layer of $TiO_2$ is disposed on a glass envelope, as is done to prevent emission of deleterious ultraviolet radiation in the 3000 to 4000 A. region, that the starting voltage of the lamp tends to rise. The rise appears to be due to a photochemical reaction between the $TiO_2$ and the mercury present in the lamp. The reaction begins to appear after 50 hours of burning time and by 100 hours it becomes impossible to start a rapid start-type lamp on commercial ballasts. We have now found that these increases can be overcome by adding particulate $Sb_2O_3$ to the $TiO_2$ filter coat. Quantities in the range of 2 to 5 percent by weight of $TiO_2$ appear to be generally useful. Above these quantities, the visible light is filtered by the $TiO_2$ coating and below, the increased starting voltages are not overcome. Preferably, quantities in the range of 2.0 to 2.5 percent by weight are highly advantageous in attaining our objectives.

DESCRIPTION OF THE PREFERRED EMBODIMENTS

Figure 1:
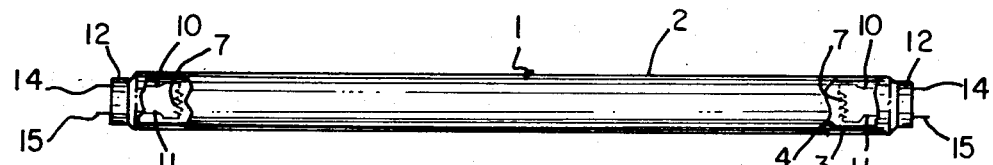
FIG. 1 shows one embodiment of a lamp according to this invention.

Referring to FIG. 1, the lamp 1 has a sealed, hollow, glass tube 2 containing a filling of 85% argon and 15% helium (although other suitable gas fillings may be used). On the inside surface of the glass envelope there is a coating 4 of the phosphor which may be, for example, any suitable fluorescent lamp phosphor. The coating 3 of $TiO_2$ and $Sb_2O_3$ is disposed directly upon the glass and beneath the phosphor. The coating is transparent and generally less than one micron thick.

At each end of the glass tube 1 there is a conventional electrode comprising an oxide-coated tungsten coil 7 and support and lead-in wires 10 and 11, as shown, for example, in United States Patent No. 2,961,566 of John F. Waymouth et al. for a Fluorescent Lamp. The usual insulating plastic base 12, carrying contacts 14, 15, can be shown, for example, in United States Patent No. 2,896,187, issued July 21, 1959 to R. B. Thomas and S. C. Shappell, for a Lamp Base, or some other suitable base can be used.

As described in the following Table I, the addition of $TiO_2$ layer to the lamp does not produce any substantial reduction in luminosity during life. The luminosity at 300 hrs., for example, is substantially the same whether or not a $TiO_2$ coating is used. The starting voltages of the examples without $Sb_2O_3$, 0.5% $Sb_2O_3$ or 1.0% $Sb_2O_3$ are substantially above those in the 2% and above range.

TABLE I

|  | Control, no filter | $TiO_2$ and No$Sb_2O_3$ | $TiO_2$+0.5% $Sb_2O_3$ | $TiO_2$+1.0% $Sb_2O_3$ | $TiO_2$+2.0% $Sb_2O_3$ |
|---|---|---|---|---|---|
| 100 hours burning time: |  |  |  |  |  |
| Peak starting voltage | 210 | N.S.[1] | 490 | 461 | 285 |
| Brightness (lumens) | 3,270 |  | 3,244 | 3,229 | 3,238 |
| 300 hours burning time: |  |  |  |  |  |
| Peak starting voltage | 228 | N.S.[1] | 380 | 282 | 250 |
| Brightness (lumens) | 3,194 |  | 3,137 | 3,144 | 3,117 |
| 3000 hours burning time: |  |  |  |  |  |
| Peak starting voltage | 232 | N.S.[1] | 280 | 280 | 255 |
| Brightness (lumens) | 2,985 |  | (2) | 2,947 | 2,961 |

[1] N.S.—would not start at 900 volts.
[2] Not determined.

Figure 2:
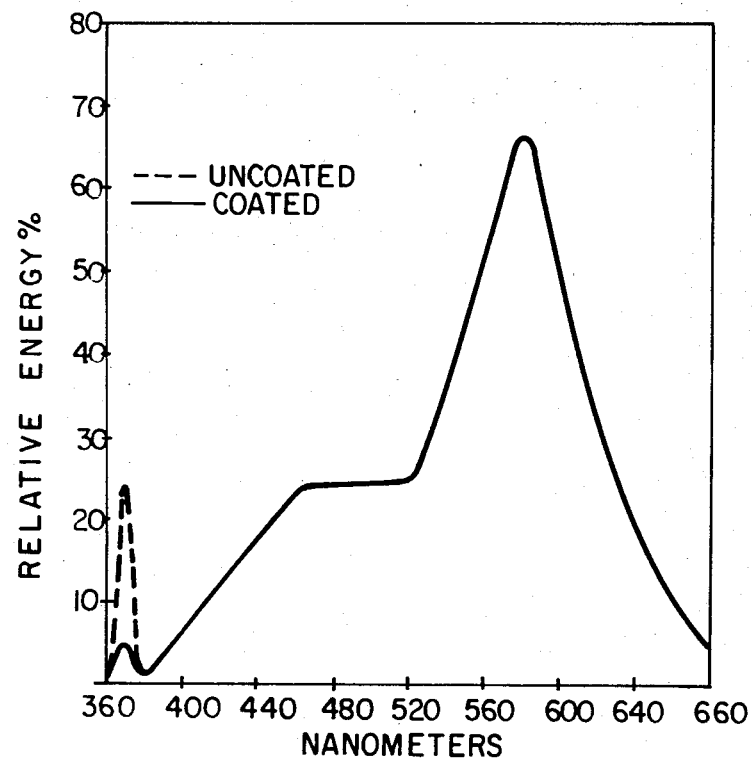
FIG. 2 is a spectral energy distribution curve showing the emitted energy of fluorescent lamps containing the $TiO_2$ layer and ones which do not.

In FIG. 2, the spectral energy distribution is shown and compared to a lamp containing a $TiO_2$ filter coat. As seen, without the $TiO_2$ coating, there is a sharp peak emitted at 360 nm. region while this peak is substantially absent in the coated lamp. Thus, the longer wave length the ultraviolet light is filtered while no substantial reduction in luminosity is evidenced.

Preferably, the $TiO_2$ which is used has a particle size less than about $0.05\mu$ and the coating thickness is less than about $0.5\mu$. As shown in Table II, when increasing quantities of $TiO_2$ are disposed on the lamp envelope (the gms. of $TiO_2$ is indicative of the thickness) no substantial reduction in luminosity is indicated. The 366 nm. UV line was almost eliminated, however.

TABLE II

| Lamp | Filter coat, $TiO_2$ (gms.) | 0 hours, lumens | 100 hours, lumens | 366 nm. line |
|---|---|---|---|---|
| A | None | 3,287 | 3,224 | .108 |
| B | 0.04 | 3,270 | 3,218 | .061 |
| C | 0.17 | 3,304 | 3,196 | .025 |
| D | 0.23 | 3,265 | 3,188 | .018 |
| E | 0.45 | 3,267 | 3,178 | .009 |

It is apparent that modifications and changes may be made within the spirit and scope of the instant invention. It is our intention, however, only to be limited by the scope of the appended claims.

As our invention, we claim:

1. A fluorescent lamp including a glass envelope, mercury and means to produce an electrical discharge within said envelope; a fluorescent phosphor enclosed within said envelope and a light transmitting, ultraviolet filtering layer, less than about 1 micron thick, of an admixture of $TiO_2$ and $Sb_2O_3$ disposed upon the inner surface of said glass envelope to filter long wave length, ultraviolet light emitted by said electrical discharge and reduce starting voltages.

2. The lamp according to claim 1 wherein said $Sb_2O_3$ is present in quantities between about 2 to 5 weight percent of said $TiO_2$.

3. The lamp according to claim 1 or 2 wherein the $TiO_2$ has a particle size less than about 0.05 micron.

References Cited

UNITED STATES PATENTS

| 2,607,014 | 8/1952 | Roy et al. | 313—109 |
| 3,094,641 | 6/1963 | Gungle et al. | 313—109 |
| 3,141,990 | 7/1964 | Ray | 313—109 X |
| 3,379,917 | 4/1968 | Menelly | 313—109 |

JAMES W. LAWRENCE, Primary Examiner

D. O'REILLY, Assistant Examiner

U.S. Cl. X.R.

117—33.5; 313—221